United States Patent [19]

Nose et al.

[11] Patent Number: 5,404,349
[45] Date of Patent: Apr. 4, 1995

[54] POSITION DISPLACEMENT DETECTING APPARATUS

[75] Inventors: Hiroyasu Nose, Zama; Toshihiko Miyazaki, Hiratsuka; Takahiro Oguchi, Atsugi; Kunihiro Sakai, Isehara; Toshimitsu Kawase, Atsugi, all of Japan

[73] Assignee: Canon Kabushiki Kaisha, Tokyo, Japan

[21] Appl. No.: 129,030

[22] Filed: Sep. 30, 1993

Related U.S. Application Data

[63] Continuation of Ser. No. 651,975, Feb. 7, 1991, abandoned.

[30] Foreign Application Priority Data

Feb. 9, 1990 [JP] Japan .................................. 2-28493
Jan. 14, 1991 [JP] Japan .................................. 3-015961

[51] Int. Cl.$^6$ ........................ G11B 9/00; G01N 23/00
[52] U.S. Cl. ................................. 369/126; 250/306
[58] Field of Search ................ 369/126, 101, 44.26, 369/32, 50, 43, 44.13; 250/306, 307, 311

[56] References Cited

U.S. PATENT DOCUMENTS

| | | | |
|---|---|---|---|
| 4,481,550 | 11/1984 | Miller et al. | 360/77 |
| 4,500,981 | 2/1985 | Sugiyama | 369/43 |
| 4,835,631 | 5/1989 | Miyake et al. | 369/43 |
| 5,059,793 | 10/1991 | Miyamoto et al. | 250/306 |
| 5,072,116 | 12/1991 | Kawade et al. | 250/306 |
| 5,144,581 | 9/1992 | Toda et al. | 369/126 |
| 5,241,527 | 8/1993 | Eguchi et al. | 369/126 |

FOREIGN PATENT DOCUMENTS

| | | |
|---|---|---|
| 0304893 | 3/1989 | European Pat. Off. . |
| 0325056 | 7/1989 | European Pat. Off. . |
| 56-80857 | 7/1981 | Japan . |
| 56-117328 | 9/1981 | Japan . |
| 57-143743 | 9/1982 | Japan . |
| 62-92185 | 4/1987 | Japan . |
| 63-201963 | 8/1988 | Japan . |
| 1154332 | 6/1989 | Japan . |

OTHER PUBLICATIONS

Helvetica Physica Acta, "Scanning Tunneling Microscopy", G. Binnig et al., vol. 55, 1982, pp. 726–735.

*Primary Examiner*—Aristotelis Psitos
*Assistant Examiner*—Nabil Hindi
*Attorney, Agent, or Firm*—Fitzpatrick, Cella, Harper & Scinto

[57] ABSTRACT

An apparatus capable of detecting a displacement of a probe from a track of a recording medium caused by track fluctuations and vibrations at a recording/reproducing period. For example, a probe is maintained to vibrate at a frequency and in the direction perpendicular to a data train at a amplitude smaller than the width of the data train. In this case, the amplitude of a reproduced signal of the data train changes with the displacement between the probe and the data train. An envelope signal of the reproduced signal is phase detected using as a reference signal the vibration waveform (standard signal) at frequency $f_o$ of the probe, to obtain a signal proportional to the displacement from the data train. Using this signal, it becomes possible to feedback control the probe so as to make it trace the data train.

10 Claims, 8 Drawing Sheets

POSITION DISPLACEMENT DETECTING APPARATUS

This application is a continuation of application Ser. No. 07/651,975 filed Feb. 7, 1991, which is now abandoned.

BACKGROUND OF THE INVENTION

1. Field of the Invention

The present invention relates to a position displacement detecting apparatus suitable for a recording/reproducing apparatus and the like, using, for example, the principle of a scan type tunnel microscope.

2. Related Background Art

There is a tendency that the capacity of data recorded by a recent recording apparatus is increasing more and more. As the capacity increases, it is essential that the dimension of a record unit becomes correspondingly small and the record density becomes correspondingly high. For example, the dimension of a record unit of a digital audio disk of optical recording type is now in the order of 1 $\mu m^2$.

A scan type tunnel microscope (hereinafter abbreviated as STM) has been recently developed with which the electron structure of a material surface or near the surface can be directly observed [refer to G. Binnig et al., Helvectica Physica Acta, 55, 726(1982)]. With STM, it is possible to measure a real space image irrespective of monocrystalline or amorphous, with high resolution. Furthermore, it is possible to observe at low power without damaging a medium by a current flowing through it. Still further, STM can operate not only under super high vacuum but also under atmosphere or solution, allowing to apply it to various materials. Wide applications have thus been expected.

STM operates basing upon the fact that if a metal probe and conductive material become as close as about 1 nm and a voltage is applied therebetween, a current will flow therebetween. This current is very sensitive to the distance change between the probe and the conductive material. Therefore, the surface information of a real space can be obtained by scanning the probe while maintaining constant a current or the average distance therebetween. In this case, the resolution in an inplane direction is equal to or larger than one angstrom.

It is possible to record information on a recording medium using the principle of STM. In this case, a record unit of 0,001 $\mu m^2$ or smaller can be recorded by using as the recording medium a material having a memory function responding to voltage/current switching characteristics, such as a thin film layer made of $\pi$ electron organic compound or chalcogenide.

A voltage in excess of a certain threshold value is applied to a probe. Then, the characteristic of a fine area of a recording medium immediately under the probe changes, thereby allowing to record data. By using the fact that a tunnel current flowing between the probe and the recording medium changes between the recorded area and the unrecorded area, reproducing data becomes possible.

Similar recording/reproducing is possible by using as a recording medium a metal thin film such as Au and Pt whose surface is locally melted or evaporated to make protrusions and recesses upon application of a voltage in excess of a certain threshold voltage.

SUMMARY OF THE INVENTION

The present invention uses the above-described technique, and it is an object of the present invention to provide a position displacement detecting apparatus capable of detecting a displacement of a probe from a data train to be caused by thermal drifts, external vibrations or the others since the data train is very narrow.

Other objects of the present invention will become apparent from the following detailed description of preferred embodiments.

DETAILED DESCRIPTION OF THE PREFERRED EMBODIMENTS

The embodiments of this invention will be described with reference to the accompanying drawings.

Figure 1:
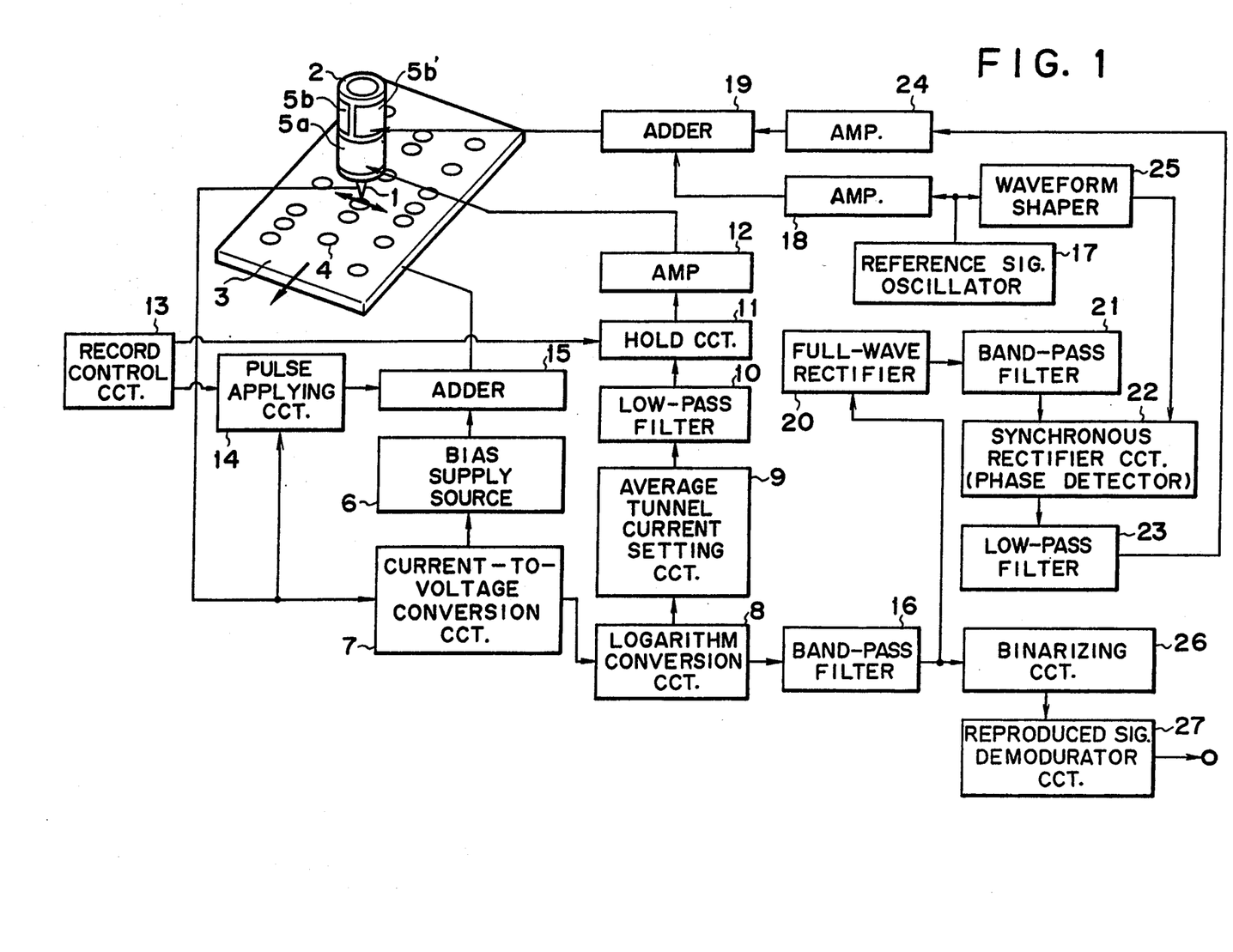
FIG. 1 is a block diagram showing the structure of a recording/reproducing apparatus according to a first embodiment of this invention.
Figure 2:
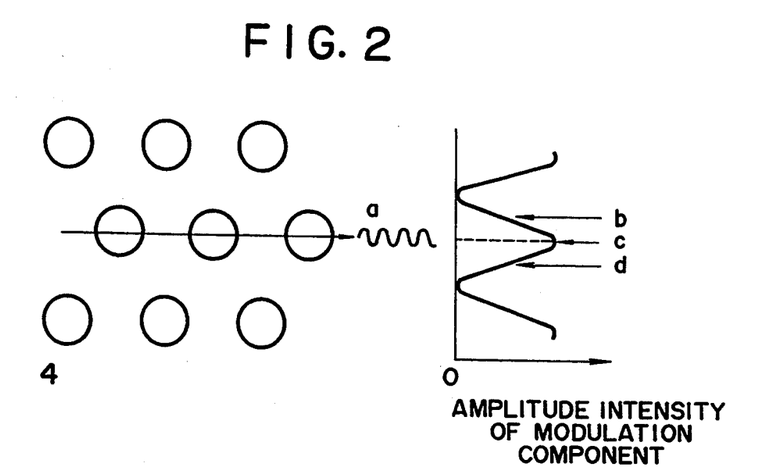
FIG. 2 shows the relative positions of a scan locus of a probe and a data train, and the intensity of modulation components of very small vibrations contained in a detected signal.
Figure 3:
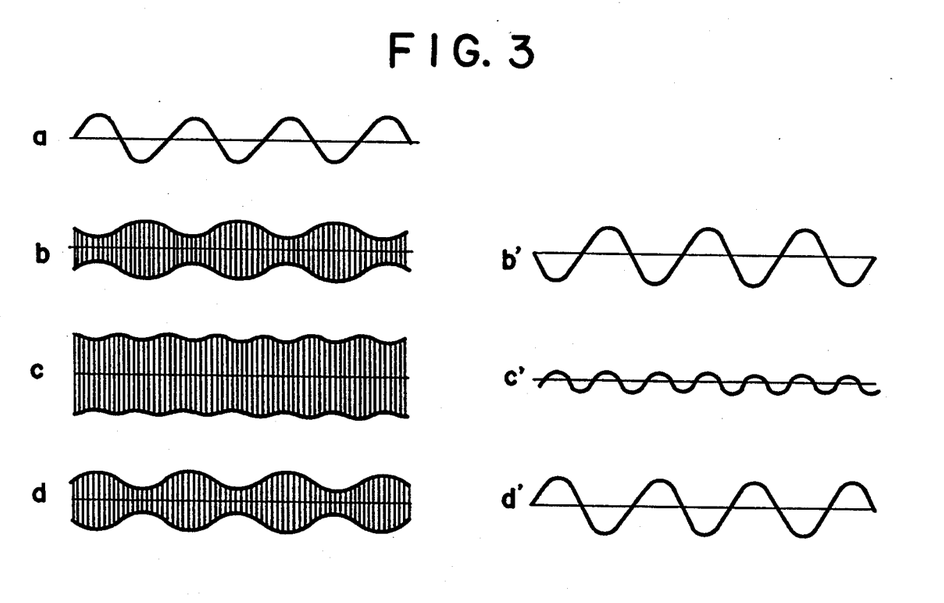
FIG. 3 shows waveforms of detected tunnel current signals.
Figure 4:
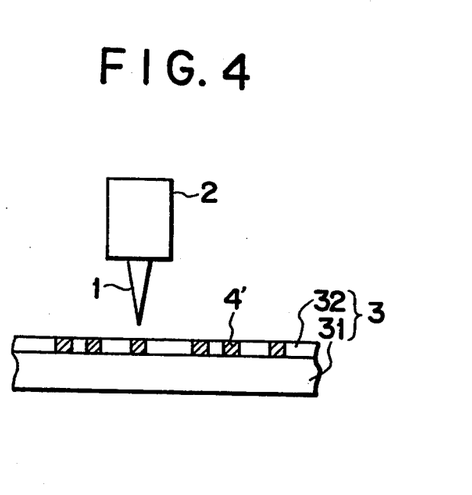
FIG. 4 illustrates how data is recorded on a recording medium which changes its electrical characteristic.
Figure 5:
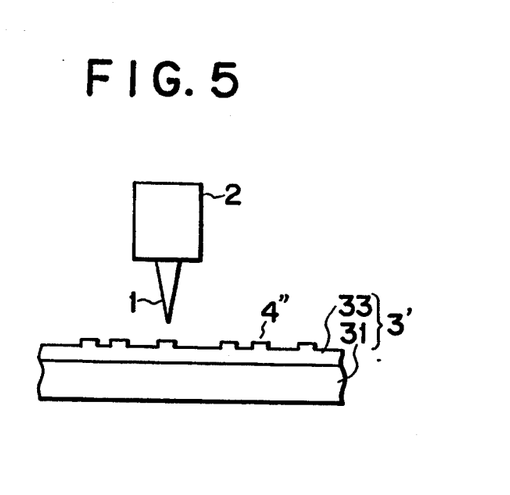
FIG. 5 illustrates how data is recorded on a recording medium which changes its surface configuration.
Figure 6:
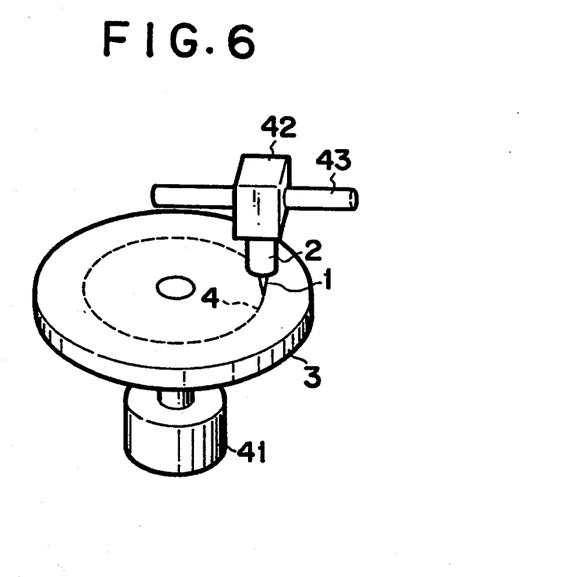
FIG. 6 is a perspective view showing the recording/reproducing apparatus of the first embodiment using a disk recording medium.

FIG. 1 is a block diagram showing the structure of a recording/reproducing apparatus according to a first embodiment of this invention, FIG. 2 shows the relative positions of a probe and a data train, and the intensity of modulation components of very small vibrations contained in a detected signal, FIG. 3 shows waveforms of signals, FIGS. 4 and 5 illustrate how data is recorded, and FIG. 6 is a perspective view showing a disk recording medium and the recording/reproducing apparatus of the first embodiment for recording data into or reproducing data from the disk.

Referring to FIG. 6, the outline of the structure of the apparatus will be described. Reference numeral 1 represents a probe for recording/reproducing information, 2 a cylindrical piezoelectric element for driving the probe 1, 3 a recording medium, and 4 a data train recorded on the recording medium.

The recording medium of a disk type is rotated by a motor 41 at a constant angular velocity or at a constant linear velocity. The data train 4 is recorded on the recording medium 3 either spirally or concentrically. The probe 1 along with the cylindrical piezoelectric element 2 is fixed to a head unit 42 which is linearly driven in the radial direction of the recording medium 3 along a guide shaft 43 by means of a drive mechanism such as a linear motor (not shown). Therefore, any desired data train can be accessed for data recording/reproducing. An access to a target data train is achieved by detecting the position of the head unit 42 with a position detector such as a well-known linear encoder and adjusting the position of the head unit 42. After the access, the probe is controlled (tracking control) to track the target data train in the manner described later.

The recording medium 3 will be described next with reference to FIG. 4. The recording medium 3 shown in FIG. 4 is constituted by a thin film recording layer 32 made of such as $\pi$ electron organic compound and chalcogenide, and a conductive substrate 31. In recording data, the probe 1 is caused to access the position where a data train is recorded. A bias voltage is applied between the probe 1 and the substrate 31 by using a voltage supply source (not shown). Then, the probe 1 and the recording medium 32 are made close to each other to the extent that a tunnel current flows therebetween. While maintaining the distance between the probe 1 and the recording medium 32 constant, the recording medium 3 is rotated by a motor 41 shown in FIG. 6. When the probe 1 comes to a predetermined position of the recording layer 32, there is applied between the probe 1 and the substrate 31 a voltage in excess of the threshold value of the recording layer material. As a result, the electrical characteristic of a fine area immediately below the probe will change (characteristic changed area 4'). For example, this area is assumed to be a data bit (ON bit) of binary data "1" state, whereas the area not applied with a voltage in excess of the threshold voltage and having the original electrical characteristic is assumed to be a data bit (OFF bit) of binary data "0" state. By rotating the recording medium 3 to provide a relative motion between the recording layer 32 and the probe 1, and applying a voltage in excess of the threshold value at particular positions of the recording layer 32 in accordance with record information, it is possible to record binary data on the recording layer 32 as shown in FIG. 4.

In reproducing information recorded in the above-described manner, the probe 1 is caused to access a target data train and a bias voltage is applied between the probe 1 and the substrate 31 similar to the case of data recording. Then, the probe 1 and recording layer 32 are made close to each other to the extent that a tunnel current flows. While maintaining constant the distance between the probe 1 and the recording layer 32, the recording medium 3 is rotated to scan the recording layer 32 with the probe 1. In this case, the tunnel current flowing between the probe 1 and the recording layer 32 changes between the case where the probe 1 passes the characteristic changed area (recorded area) of ON bit and the case where the probe 1 passes the characteristic unchanged area (unrecorded area) of OFF bit. This change is detected and binarized using a predetermined threshold value while scanning the recording layer 32 with the probe 1, to thereby reproduce the recorded binary data.

Another example of the recording medium will be described with reference to FIG. 5. The recording medium 3' shown in FIG. 5 is constituted by a recording layer 33 made of a metal thin film of Au, Pt and the like, and a substrate 31. A bias voltage is applied between the probe 1 and the recording layer 33. While maintaining the distance there between constant similar to the above case, a voltage in excess of a threshold value is applied. As a result, a fine local area immediately under the probe is melted or 10 evaporated to change the surface configuration to have protrusions and recesses so that a data train is recorded (protruded area 4"). If the height of protrusions and the depth of recesses are set equal to or smaller than several nm, the tip of the probe will not come in contact with the protrusions during data reproduction, with the distance between the probe 1 and the recording layer 33 being maintained substantially constant. Since the distance between the probe ! and the recording layer 32 changes between the case where the probe 1 passes the recorded area and the case where the probe 1 passes the unrecorded area, the tunnel current changes which change is detected in the similar manner described above, to thereby reproduce data.

Next, a method of recording/reproducing information will be described in particular with reference to FIG. 1.

In recording data, the probe 1 is moved by a transport mechanism to the recording position as described with FIG. 6, and a voltage in excess of a threshold voltage is applied to the recording medium 3.

While the probe 1 is moved to the recording position, a bias voltage from a bias supply source 6 is being applied between the probe 1 and the recording medium 3. A tunnel current flowing between the probe 1 and the recording medium 3 is converted into a voltage signal by a current-to-voltage conversion circuit 7, and logarithm-converted by a logarithm conversion circuit 8 so that the signal value becomes proportional to the distance between the probe and the recording medium. An output signal from the logarithm circuit 8 is inputted to an average tunnel current setting circuit 9 from which a difference signal (error signal) from a set signal value corresponding to a desired distance between the probe and the recording layer is outputted. This output signal is sent as a control signal to the Z-direction control electrode 5a of the cylindrical piezoelectric element via a low-pass filter 10 for passing a signal whose frequency is sufficiently lower than the bit detection frequency, a hold circuit 11, and an amplifier 12. Even if the distance between the probe 1 and the recording layer changes because of unevenness on the recording layer surface sufficiently larger than a data bit, a change in the tunnel current caused by the unevenness is converted into an error signal by the average tunnel current setting circuit 9 and a control signal from the amplifier 12 is applied to the X-direction control electrode 5a of the cylindrical piezoelectric element so as to make the error signal zero. In this manner, the distance between the probe 1 and the recording layer is maintained substantially constant. Namely, the average distance between the probe 1 and the recording medium 3 under relative motion is controlled to be constant.

In recording data, a record control circuit 13 sends a signal corresponding to a record signal to a pulse applying circuit 14. A pulse voltage from the pulse applying circuit 14 is added to the bias voltage by an adder 15. The voltage outputted from the adder 15 is applied between the recording medium 3 and the probe 1 to thereby record data in the manner described previously. At the same timing of applying the pulse voltage, the record control circuit 13 sends a signal to the hold circuit 11. Therefore, the hold circuit 11 holds an output signal value so as not to change the distance between the probe 1 and the recording medium 3 while the pulse voltage is applied. As a result, the control voltage to the Z-direction control electrode 5a of the cylindrical piezoelectric element 2 is held.

As described with FIG. 6, in reproducing data, the probe 1 is moved to a desired data train by a transport mechanism. The probe 1 is then scanned to detect a change in the tunnel current flowing between the probe and the recording medium 3 surface caused by the characteristic difference (height difference) between the recorded area and the unrecorded area, to thereby reproduce information. Since a data train is recorded only by positioning the probe 1 by means of the position detection unit of the transport mechanism, the recorded data train may sometimes fluctuate minutely by the influences of thermal drifts and external vibrations. Such influences are also met at the time of reproducing. Therefore, positioning the probe 1 only by the position detection unit of the transport mechanism may sometimes result in an inability of the probe 1 to trace the data train, thereby making poor the S/N ratio of data reproduction. In view of this, according to the present invention, after the probe is moved by the transport mechanism to a desired data train, it is controlled so as to track the data train and reproduce the data. This control will be described below.

In the block diagram shown in FIG. 1, similar to the case of data recording, in reproducing data the probe 1 is controlled in the Z-direction by portion corresponding to the electrode 5a of the cylindrical piezoelectric element 2 so as to make constant the average distance between the probe 1 and the recording medium 3.

The tunnel current obtained while the probe 1 scans the data train superposes upon reproduced signal components of the data train, variable components of fluctuation of the recording layer surface and the like. An output from the logarithm conversion circuit 8 is supplied to a band-pass filter 16 to derive only the signal near at the reproduced signal frequency. In this invention, the probe 1 is caused to vibrate at a frequency f at a smaller amplitude than the width of the data train 4 in the direction perpendicular to the data train 4. This will be described with reference to FIG. 2 and FIG. 3. FIG. 2 shows an example of data trains and a graph showing the amplitude intensity of modulation components relative to the probe scan position. As shown in this graph, the amplitude intensity of modulation components becomes maximum when the probe scans the center of the data train and becomes smaller as the probe 1 displaces from the center of the data train. As the probe 1 vibrates minutely at the frequency $f_o$, the envelope of the reproduced signal of the data train changes as indicated at b, c, and d in FIG. 3 which correspond to b, c, and d in FIG. 2. The envelope signal becomes as indicated at b', c' and d'. Specifically, the vibration waveform a of the probe 1 becomes small as indicated at c' when the probe 1 scans the center of the data train as indicated at an arrow c. If the probe 1 displaces upward as indicated by an arrow b, the vibration waveform a of the probe 1 becomes to have a large amplitude and shifted by 180 degrees in phase. If the probe 1 displaced downward as indicated by an arrow d, the vibration waveform a of the probe becomes to have a large amplitude and be in phase with the vibration waveform a. If phase detection is performed using the vibration waveform (standard signal) of the probe 1 at the frequency $f_o$ as the reference signal it is possible to obtain a signal proportional to the displacement amount from the data train. Using this signal, a feedback control can be carried out for positioning the probe 1 on the data train. Specifically, this signal is added to the control voltage of the X- or Y-direction control electrode (5b, 5b') of the cylindrical piezoelectric element 2, in such a way that the signal becomes 0 and the feedback control, i.e., tracking control is conducted which locates the probe 1 at the position indicated at c in FIG. 2.

Referring back to FIG. 1, a sinusoidal wave at a frequency f generated by a reference signal oscillator 17 is applied to the electrodes 5b and 5b' of the cylindrical piezoelectric element 2 via an amplifier 18 and an adder 19. The probe 1 is accordingly maintained to vibrate minutely in the direction perpendicular to the data train. On the other hand, the reproduced signal of the data train superposed upon an output from the band-pass filter 16 is rectified by a full-wave rectifier 20. The reproduced signal frequency components of the data train are removed by a band-pass filter 21, to thereby derive only the envelope signal, i.e., the frequency components at the same frequency f of the probe. This envelope signal is inputted to a synchronous rectifier circuit (phase detector) 22 to perform synchronous rectification (phase detection) by using as a reference signal the rectangular signal obtained from a waveform shaper 25 obtained from the standard signal at the frequency f for minutely vibrating the probe 1. An output from the synchronous rectifier circuit is smoothed by a low-pass filter 23 to obtain a signal proportional to the displacement amount between the probe 1 and the data train. This signal is a position displacement signal.

The position displacement signal is amplified by an amplifier 24 and added to the very small vibration signal of the probe 1 at the adder 19. The added signal is applied as a drive voltage to the electrodes 5b and 5b' of the cylindrical piezoelectric element 2. In this manner, the probe 1 is controlled in the direction perpendicular to the data train so as not to displace from the data train. While the probe 1 thus tracks the data train, the reproduced signal of the data train from the band-pass filter 16 is binarized by a binarizing circuit 26 and reproduced by a reproduced signal demodulator circuit 27. In this manner, a stable reproduced signal of a good S/N ratio can be obtained. Namely, by controlling the probe to track the data train in the manner described above, a stable reproduced signal can be obtained without the influences of fluctuations of data train, thermal drifts, and external vibrations.

Figure 8:
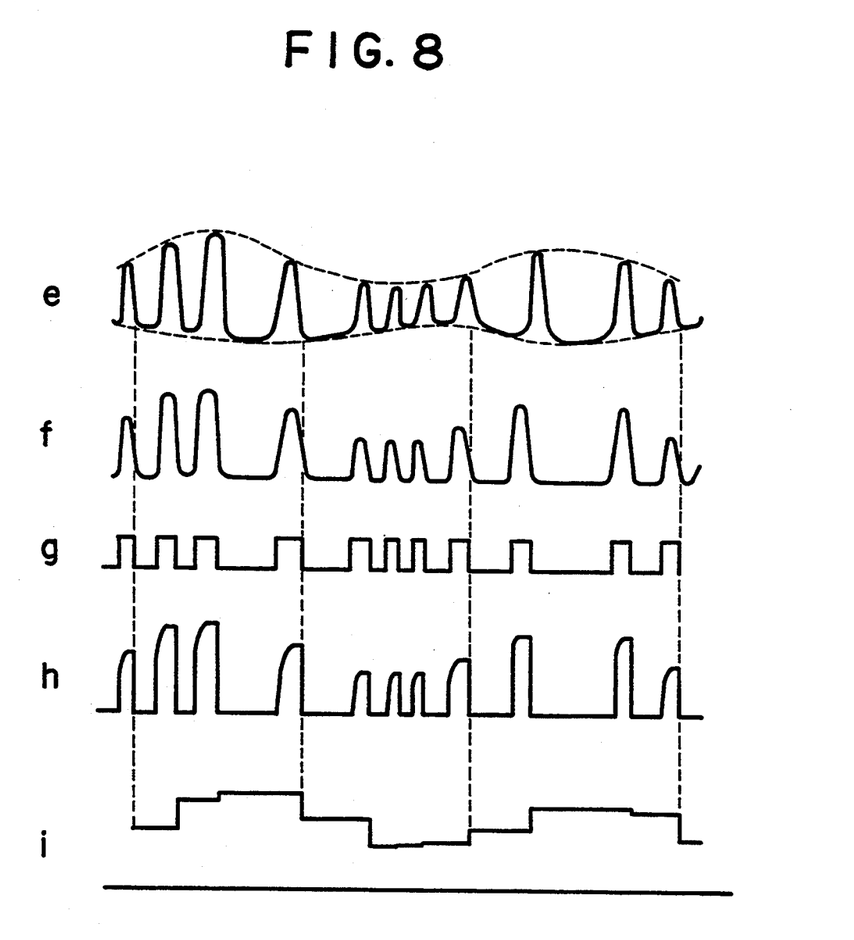
FIG. 8 is a timing chart illustrating the position displacement detecting operation of the apparatus shown in FIG. 7.
Figure 9:
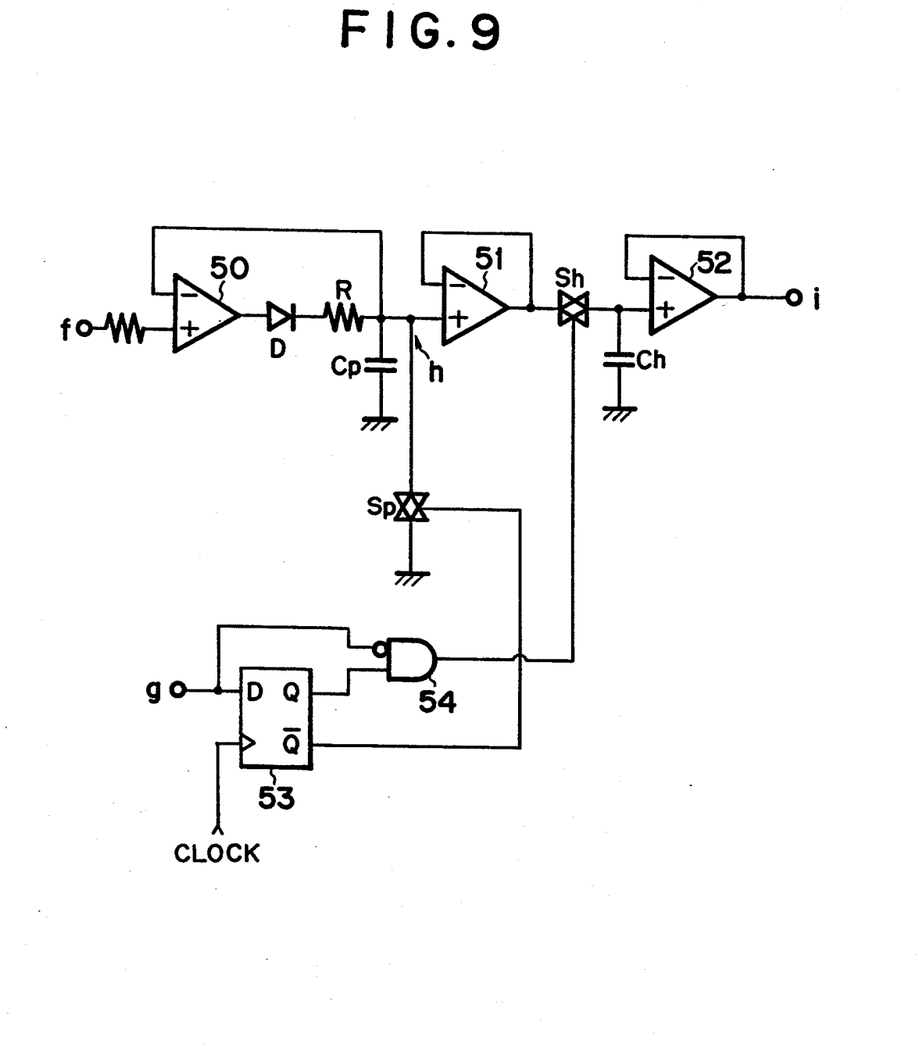
FIG. 9 shows an example of the circuit arrangement of the maximum value detector of the apparatus shown in FIG. 7.

The second embodiment of this invention will be described with reference to FIGS. 7 to 9. The perspective view of the embodiment apparatus, recording medium, recording/reproducing, and the like are the same as the first embodiment, so the description thereof is omitted. Like elements to those of the first embodiment are represented by using identical reference numerals.

Figure 7:
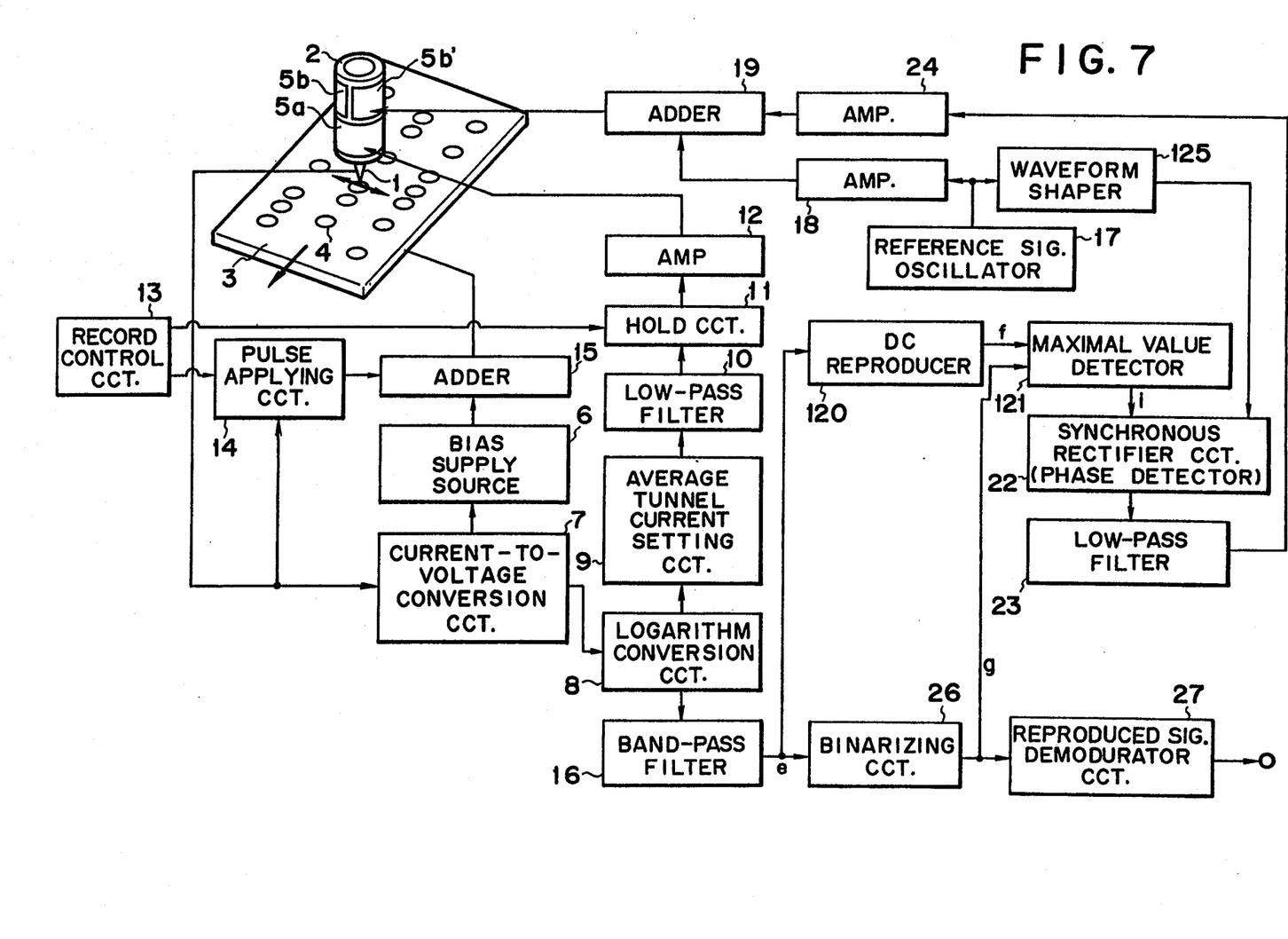
FIG. 7 is a block diagram showing the recording/reproducing apparatus according to the second embodiment of this invention.

FIG. 7 is a block diagram showing the structure of the embodiment apparatus.

In FIGS. 2 and 3, the bits or ON bits where the characteristic has changed or where the recording layer material has deformed, have been described assuming that they are disposed at equal pitch. There are in some cases ON bits disposed at random (aperiodically) according to the actual record data as particularly shown in FIG. 1. In this case, the ratio of ON bits to OFF bits is not usually 1:1, but ON bits are smaller in number than OFF bits. Furthermore, OFF bits may sometimes continue for a long period. The envelope of the reproduced signal for detecting the position displacement described above has paid attention only to ON bit data. The envelope composed of maximum values of ON bit signals is calculated to phase-detect it using the standard signal at the frequency $f_o$, thereby obtaining the position displacement. If the position displacement is obtained by forming the envelope from the detected reproduced signal in the manner described above, there occurs a problem that phase detection cannot be performed correctly for the signal portion having a large number of OFF bits and that if noises generate at the OFF bit signal portion, the envelope will be distorted. In view of the above, the embodiment apparatus interpolates the OFF bit signal portion in the following manner.

Referring to FIG. 7, a sinusoidal wave at the frequency $f_o$ generated by the reference signal oscillator 17 is applied to the electrodes 5b and 5b' of the cylindrical piezoelectric element 2 via the amplifier 18 and the adder 19. The probe 1 is accordingly maintained to minutely vibrate in the direction perpendicular to the data train in the manner described previously. The reproduced signal of the data train, i.e., an output from the band-pass filter 16, is wave-shaped by a DC regenerator 120 such that the record level of an OFF bit becomes zero potential, and an output signal f therefrom is inputted to a maximum value detector 121. The output e of the band-pass filter 16 is binarized by the binarizing circuit 26, and an output signal g therefrom is inputted to the maximum value detector 121 and the reproduced signal demodulator circuit 27. The demodulated signal from the reproduced signal demodulator circuit 27 is sent as a read-out data to an unrepresented display unit, control unit and the like.

The maximum value detector 121 detects the maximum value of the signal f only during the ON bit state period of the data train, and thereafter holds this maximum value. FIG. 8 is a timing chart showing various signals in the embodiment apparatus, and FIG. 9 shows an example of the circuit of the maximum value detector 121. The following description will be given with reference to FIGS. 7, 8 and 9.

The signal f DC-regenerated from the output e of the band-pass filter 16 is inputted to an OP amplifier 50. The output of the OP amplifier 50 is fed back to the inverting input of the OP amplifier via a diode D and a resistor R which is grounded via a capacitor Cp. This circuit constitutes a peak hold circuit. When the binarized output g enters a logic "1" state, an analog switch Sp circuit transits to an OFF state to start the peak hold operation. This circuit is reset when the binarized output g enters a logic "0" state. The output g of the binarizing circuit takes "1" when the data train bit is in an ON state, and "0" when it is in an OFF state. Namely, this peak hold circuit operates only when the ON bit of the data train is detected. As the binarized output g changes from "1" to "0", a trailing edge detector circuit constituted by a D-type flip-flop 53 and AND gate 54 causes an analog switch Sh to turn on. Therefore, the output h of the peak hold circuit is transferred via an OP amplifier 51 to a hold capacitor Ch. At the same time, the peak hold capacitor Cp is shortened by the analog switch Sp to prepare for the next maximum value detection cycle. The voltage across the hold capacitor Ch is supplied as a signal i to a phase detector circuit via an OP amplifier 52 having a low input bias current. Clocks inputted to the flip-flop 53 are used for detecting an edge at a proper timing, and supplied from a clock generator circuit (not shown).

With the above operation, it becomes possible to generate an envelope signal i composed of maximum values of ON bits contained in the data train signal. In this envelope signal i, the OFF bit signal portion is interpolated by holding the maximum value of the ON bit immediately before the OFF bit by means of the peak hold circuit. The envelope signal can therefore be considered as equivalent to the envelope signal obtained when ON bits are periodically and densely arranged within the data train signal. The envelope signal thus obtained contains the very small vibration components at the frequency $f_o$ of the probe 1 without having the above-described adverse effects to be caused by OFF bits. This envelope signal is inputted to the phase detector 22 and subjected to synchronous detection using as the reference signal a rectangular signal obtained by converting the standard signal at the frequency $f_o$ by the waveform shaper 125. The output of the phase detector 22 is smoothed by the low-pass filter 23 to derive a signal proportional to the displacement amount between the probe 1 and the data train, the derived signal being the position displacement signal.

The position displacement signal supplied to the amplifier 24 is added to the very small vibration signal of the probe 1 by the adder 19. The resultant signal is applied as the control voltage to the electrodes 5b and 5b' of the cylindrical piezoelectric element 2. As a result, the probe 1 is controlled (tracking control) in the direction perpendicular to the data train without displacing therefrom. In this condition, the reproduced signal of the data train outputted from the band-pass filter 16 is binarized by the binarizing circuit 26, and outputted as a read-out signal from the reproduced signal demodulator circuit 27.

Since the data signal is reproduced under tracking control, a stable reproduced signal with good S/N ratio can be obtained. By controlling the probe to track the data train in the above manner, tracking becomes unsusceptible to fluctuations of the data train, thermal drifts, and external vibrations.

Furthermore, the position displacement is regulated by using maximum values of ON bits corresponding to a large tunnel current, and the OFF bit signal portion is interpolated. As a result, it is possible to track the data train while retaining a stable and large pull-in range and making unsusceptible to noises likely to be generated on an OFF bit signal.

Still further, if there is no data train on the medium or the probe becomes completely apart from the data train by external influences, the binarized output becomes always 0 and the output of the maximum value detector becomes constant. As a result, the probe returns the standard position at the speed corresponding to the time constant of the low-pass filter 23. If the data train is again detected under control by the position determining unit, the tracking operation of the data train starts again. In this manner, signal regeneration is possible without disturbed tracking even if ON bits of the tracked data train are disposed at random or there occurs a so-called burst error caused by partial defects of the medium. Interpolation described above is effective for the apparatus which tracks data bits.

Figure 10:
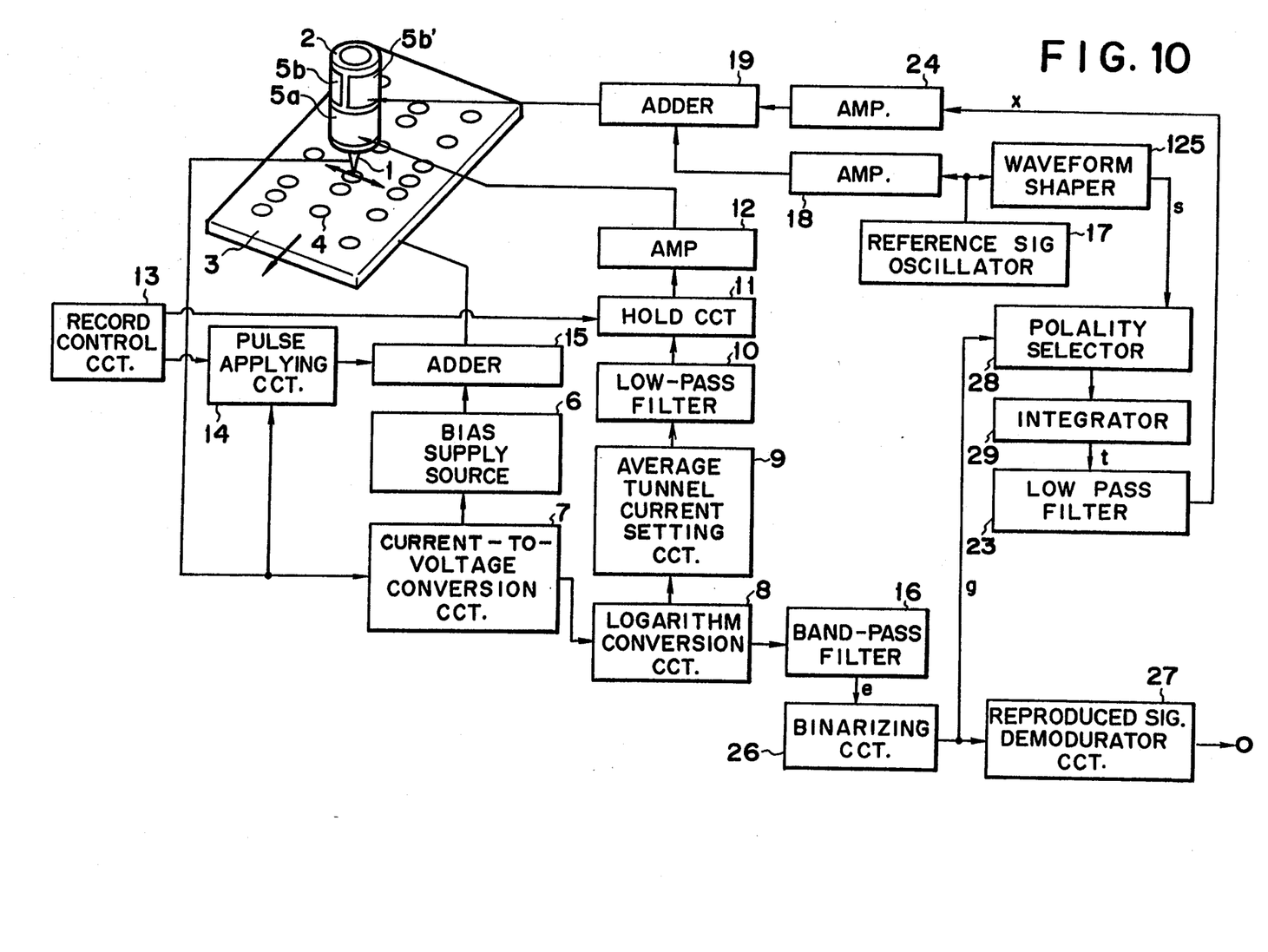
FIG. 10 is a block diagram showing the recording/reproducing apparatus according to the third embodiment of this invention.
Figure 11:
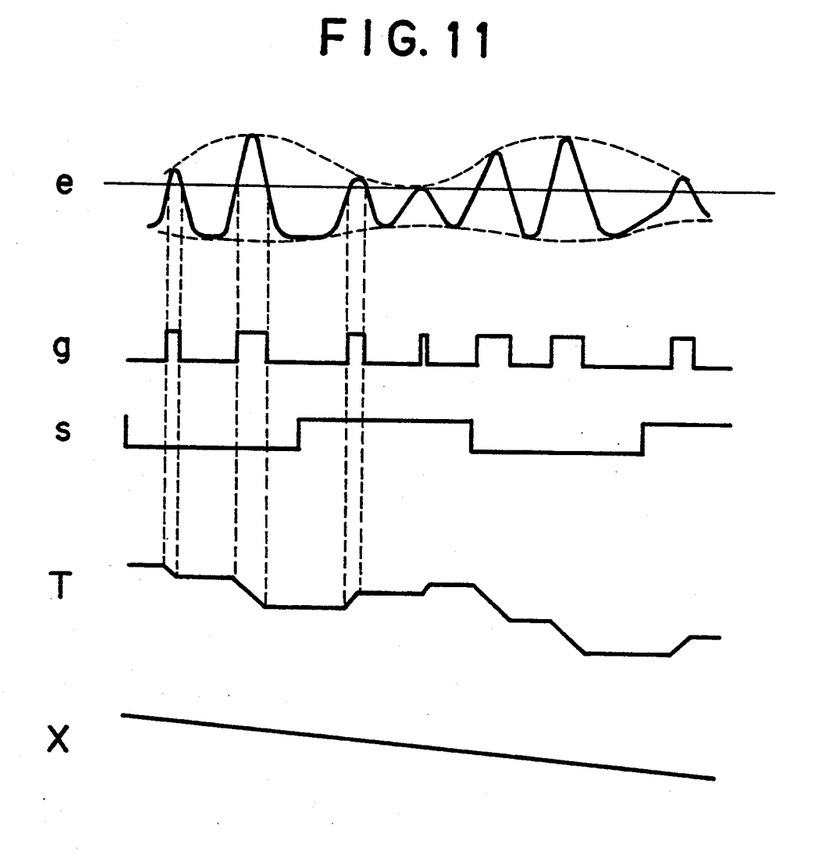
FIG. 11 is a timing chart illustrating the position displacement detecting operation of the apparatus shown in FIG. 10.

FIG. 10 is a block diagram showing the structure of the third embodiment of this invention, and FIG. 11 is a timing chart illustrating the operation of the circuit shown in FIG. 10. Like elements to those shown in the first and second embodiments are represented by identical reference numerals, and the description thereof is omitted.

In this embodiment, the signal components e of the data train obtained from the detected tunnel current and passed through the band-pass filter 16 is binarized at a fixed slice level by the binarizing circuit 26. The binarized output g has a narrower pulse width the more the probe displaces from the data train.

The binarized output g is inputted via a polarity selector to an integrator 29. The polarity selector 28 reverses the polarity of the binarized output g in accordance with the output s of the wave shaper 125. Accordingly, the integration polarity of the binarized pulse is determined in accordance with the phase of the standard signal for vibrating the probe. If the probe 1 scans the center of the data train, the sum of pulse widths of the binarized output g becomes ideally equal both for the case where the minutely vibrating probe 1 is on one side of the data train relative to the center thereof, and for the case where it is on the other side. Therefore, the integration output t becomes eventually 0 by determining the integration polarity by the output s of the waveform shaper 125, i.e., by adding the pulse widths if the probe 1 is on the one side and by subtracting them if the probe is on the other side. On the contrary, if the probe 1 displaces from the data train, the sum of pulse widths of the binarized output g becomes larger the more the minutely vibrating probe 1 comes near the center of the data train. Accordingly, the integration output t continues to increase so long as the probe is displaced from the center of the data train. When the displacement becomes zero, the integration output t eventually takes a constant value.

The integration output t is smoothed by a low-pass filter 23 to generate the position displacement signal x. This signal is amplified by the amplifier 24 at a desired amplification factor, added to the minutely vibrating signal of the probe 1 at the adder 19 so as to return the probe 1 to the center of the data train, and applied to the electrodes 5b and 5b' of the cylindrical piezoelectric element 2. In this manner, the probe 1 is controlled (tracking control) in the direction perpendicular to the data train so as not to displace the probe 1 from the data train but to keep it substantially track the data train.

Tracking the data train using the integration value of pulse widths of a binarized reproduced signal can avoid the influence of pulse-like high frequency noises having high peak values contained in the reproduced signal. Furthermore, binarization errors caused by thermal noises generated by the current-voltage converter circuit, logarithm conversion circuit and the like, ripple noises superposed upon the reproduced signal can be cancelled out almost all by the integrator because noise waveforms are symmetrical as to their position/negative polarities. Accordingly, tracking operation highly resistive to noises becomes possible.

Furthermore, if the data train is intercepted, the binarized output becomes 0 so that the output of the integrator is held as it is to thereby hold the position of the probe until the data train is again detected. It is therefore possible to realize a stable tracking operation even for data recording using a signal modulation scheme with a long code distance and broad frequency spectrum.

The present invention is not limited to the above embodiments only, but various modifications are possible. For example, although analog circuits have been used in the above embodiments, the operation function may be achieved by digital processing using a digital signal processor or the like. Although a disk type recording medium has been used in the above embodiments, similar control may be conducted using a card type or tape type recording medium.

Further, in the above embodiments, instead of minutely vibrating the probe, the recording medium may be minutely vibrated by means of driving units. Driving the probe is not necessarily limited to the cylindrical piezoelectric element, but other driving elements such as bimorph piezoelectric elements or the like may also be used.

As described so far, the present invention allows the recording/reproducing apparatus to detect even the displacement of the probe from the data train.

What is claimed is:

1. An apparatus for reproducing information by moving a probe relative to a train of data bits formed on a recording medium, the data bit train being disposed a periodically in accordance with recorded information, said apparatus comprising:
   a probe;
   driving means for driving and relatively moving said probe substantially along the data bits;
   vibrating means for giving to said probe relatively moving generally along the data bits, a relative vibration in a direction intersecting a direction in which the data bit train is disposed;
   data bit detecting means for obtaining a detection signal of the data bits with said probe relatively moved by said driving means;
   position displacement detecting means for detecting a position displacement of said probe from the data bit train in the direction intersecting the direction in which the data bit train is disposed, in accordance with the data bit detection signal obtained by said data bit detecting means; and
   feedback controlling means for controlling the position of said probe in the direction intersecting the direction in which the data bit train is disposed, in accordance with the detection result by said position displacement detecting means,
   whereby the recorded information in the recording medium is reproduced in accordance with the data bit detection signal obtained by said data bit detecting means using the probe position controlled by said feedback controlling means,
   wherein said position displacement detecting means comprises a synchronous rectifier circuit for phase-detecting an envelope signal of the data bit detection signal obtained by said data bit detecting means by means of said probe vibrated by said vibrating means, by using as a reference signal a vibration signal corresponding to the vibration given by said vibrating means, and
   wherein said position displacement detecting means comprises interpolating means for interpolating a signal portion corresponding to bit positions where there is no detection, and said synchronous rectifier circuit carries out the phase detection in accordance with a signal interpolated by said interpolating means.

2. (Amended) An apparatus according to claim 1, wherein said interpolating means comprises envelope generating mean for generating an envelope signal in accordance with only maximum values of a signal from said probe at the signal portion corresponding to data bits where there is the detection signal so as to interpolate the signal portion corresponding to bit positions where there is no detection signal, and said synchronous rectifier circuit phase-detects the envelope signal from said envelope generating means.

3. An apparatus according to claim 1, wherein said position displacement detecting means further comprises:
   means for binarizing a detection signal from said probe;
   polarity selecting means for selecting the polarity of the binarized signal, by suing as a reference signal a vibration signal corresponding to the vibration given by said vibrating means; and
   an integrator for integrating a signal whose polarity has been changed by said polarity selecting means.

4. An apparatus according to claim 1, wherein said data bit detecting means comprises voltage applying means for applying a voltage between said probe and the recording medium, and current detecting means for detecting a current flowing between said probe and the recording medium with the voltage being applied by said voltage applying means, whereby the detection signal of said data bits is obtained by detecting a current change by said-current detecting means.

5. An apparatus according to claim 4, wherein said data bit detecting means obtains the data bits in the recording medium at an electric characteristic changed area.

6. An apparatus according to claim 4, wherein said data bit detecting means obtains the detection signal of the data bits in the recording medium at recesses or protrusions thereof.

7. An apparatus according to claim 1, further comprising information recording means for recording information in the recording medium with said probe.

8. An apparatus for reproducing information by relatively moving a probe along a train of data bits formed on a recording medium, the data bit train being disposed aperiodically in accordance with recorded information, said apparatus comprising:
   a probe;
   a driving element for driving and relatively moving said probe substantially along the data bits;
   vibrating means for giving to said probe relatively moving generally along the data bits, a relative vibration in a direction intersecting a direction in which the data bit train is disposed;
   a data bit detecting circuit for obtaining a detection signal of the data bits with said probe;
   a position displacement detecting circuit for detecting the position displacement of said probe from the data bit train in a direction intersecting the direction in which the data bit train is disposed, in accordance with the data bit detection signal obtained by said data bit detecting circuit; and
   a feedback controlling circuit for controlling a position of said probe in the direction intersecting the direction in which the data bit train is disposed, in accordance with the detection result by said position displacement detecting circuit,
   whereby the recorded information in the recording medium is reproduced in accordance with the data bit detection signal obtained by said data bit detecting circuit using the probe position controlled by said feedback controlling circuit,
   wherein said position displacement detecting means comprises a synchronous rectifier circuit for phase-detecting an envelope signal of the data bit detection signal obtained by said data bit detecting means by means of said probe vibrated by said vibrating means, by using as a reference signal a vibration signal corresponding to the vibration given by said vibrating means, and
   wherein said position displacement detecting means comprises interpolating means for interpolating a signal portion corresponding to bit positions where there is no detection, and said synchronous rectifier circuit carries out the phase detection in accordance with a signal interpolated by said interpolating means.

9. A method of reproducing information by relatively moving a probe along a train of data bits formed on a recording medium, the data bit train being disposed aperiodically in accordance with recorded information, said method comprising the steps of:
   relatively moving the probe substantially along the data bits;
   giving a relative vibration to the probe in a direction intersecting a direction in which the data bit train is disposed;
   forming a detection signal of the data bits with the probe moving relative to the data bits;
   detecting the position displacement of the probe from the data bit train in the direction intersecting the direction in which the data bit train is disposed, in accordance with the data bit detection signal;
   controlling the position of the probe in the direction intersecting the direction in which the data bit train is disposed in accordance with the detection result by said position displacement detection; and
   reproducing the recorded information in the recording medium using the data bit detection signal formed by the position controlled probe.
   wherein the position displacement detecting step comprises a step of phase-detecting an envelope signal of the data bit detection signal obtained by means of the vibrating probe, by using as a reference signal a vibration signal corresponding to the relative vibration, and
   wherein the position displacement detecting step comprises a step of interpolating a signal portion corresponding to bit positions where there is no detection signal.

10. A method according to claim 9, wherein the position displacement detecting step comprises the steps of:
   binarizing the detection signal from the probe;
   switching the polarity of the binarized signal using as a standard signal a vibration signal corresponding to the vibration; and
   integrating the signal whose polarity has been switched.

* * * * *

UNITED STATES PATENT AND TRADEMARK OFFICE
CERTIFICATE OF CORRECTION

PATENT NO. : 5,404,349

DATED : April 4, 1995

INVENTOR(S) : HIROYASU NOSE, ET AL.     Page 1 of 3

It is certified that error appears in the above-identified patent and that said Letters Patent is hereby corrected as shown below:

ON THE TITLE PAGE

At [56], References Cited, Foreign Patent Documents, "1154332 6/1989 Japan" should read --1-154332 6/1989 Japan--.

At [57], Abstract, line 6, "at a" should read --at an--.

IN THE DRAWINGS

Sheet 1, Figure 1, "DEMODURATOR" should read --DEMODULATOR--.

Sheet 4, Figure 7, "DEMODURATOR" should read --DEMODULATOR--.

Sheet 7, Figure 10, "DEMODURATOR" should read --DEMODULATOR--.

COLUMN 1

Line 50, "0,001 $\mu m^2$" should read --0.001 $\mu m^2$--.

COLUMN 4

Line 7, "10" should be deleted.

Line 15, "probe !" should read --probe 1--.

COLUMN 5

Line 63, "displaced" should read --is displaced--.

UNITED STATES PATENT AND TRADEMARK OFFICE
CERTIFICATE OF CORRECTION

PATENT NO. : 5,404,349

DATED : April 4, 1995

INVENTOR(S) : HIROYASU NOSE, ET AL.

It is certified that error appears in the above-identified patent and that said Letters Patent is hereby corrected as shown below:

COLUMN 6

Line 1, "signal" (first occurrence) should read --signal,--.

COLUMN 9

Line 45, "track" should read --tracking--.

COLUMN 10

Line 20, "a" should be deleted.
    Line 21, "periodically" should read --aperiodically--.
    Line 64, "(Amended)" should be deleted.
    Line 66, "mean" should read --means--.

COLUMN 11

Line 12, "suing" should read --using--.
    Line 24, ".current" should read --current--.
    Line 25, "said-current" should read --said current--.

UNITED STATES PATENT AND TRADEMARK OFFICE
CERTIFICATE OF CORRECTION

PATENT NO. : 5,404,349

DATED : April 4, 1995

INVENTOR(S) : HIROYASU NOSE, ET AL.

It is certified that error appears in the above-identified patent and that said Letters Patent is hereby corrected as shown below:

COLUMN 12

Line 2, ".accordance" should read --accordance--.
   Line 43, "probe." should read --probe,--.

Signed and Sealed this

Eleventh Day of July, 1995

Attest:

BRUCE LEHMAN

Attesting Officer     Commissioner of Patents and Trademarks